United States Patent
Phillips et al.

(10) Patent No.: US 9,528,423 B2
(45) Date of Patent: Dec. 27, 2016

(54) ON-BOARD DIAGNOSTICS SYSTEM FOR CATALYZED SUBSTRATE

(71) Applicant: JOHNSON MATTHEY PUBLIC LIMITED COMPANY, London (GB)

(72) Inventors: Paul Richard Phillips, Royston (GB); Daniel Hatcher, Royston (GB); David Bergeal, Ware (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/514,928

(22) Filed: Oct. 15, 2014

(65) Prior Publication Data

US 2015/0101317 A1    Apr. 16, 2015

Related U.S. Application Data

(60) Provisional application No. 61/891,072, filed on Oct. 15, 2013.

(51) Int. Cl.
| | |
|---|---|
| *F01N 3/10* | (2006.01) |
| *F01N 11/00* | (2006.01) |
| *F01N 13/00* | (2010.01) |
| *F01N 3/28* | (2006.01) |

(52) U.S. Cl.
CPC ............ *F01N 11/002* (2013.01); *F01N 3/103* (2013.01); *F01N 13/008* (2013.01); *F01N 3/106* (2013.01); *F01N 3/2882* (2013.01); *F01N 11/007* (2013.01); *F01N 13/009* (2014.06); *F01N 2250/02* (2013.01); *F01N 2510/0682* (2013.01); *F01N 2550/02* (2013.01); *F01N 2560/022* (2013.01); *F01N 2560/023* (2013.01); *F01N 2560/025* (2013.01); *F01N 2560/026* (2013.01); *F01N 2560/06* (2013.01); *F01N 2560/14* (2013.01); *F01N 2570/10* (2013.01); *F01N 2570/12* (2013.01); *F01N 2900/0416* (2013.01); *F01N 2900/1602* (2013.01); *Y02T 10/47* (2013.01)

(58) Field of Classification Search
CPC .... F01N 11/002; F01N 11/007; F01N 13/008; F01N 13/009; F01N 3/103; F01N 3/106; F01N 3/2882; F01N 2250/02; F01N 2510/0682; F01N 2550/02
USPC .................................................. 60/272–324
See application file for complete search history.

(56) References Cited

U.S. PATENT DOCUMENTS

| | | |
|---|---|---|
| 4,029,472 A | 6/1977 | Micheli et al. |
| 5,428,956 A | 7/1995 | Maus et al. |
| 6,009,742 A | 1/2000 | Balko et al. |

(Continued)

FOREIGN PATENT DOCUMENTS

| | | |
|---|---|---|
| DE | 2643739 A1 | 3/1978 |
| DE | 4100241 A1 | 7/1991 |

(Continued)

*Primary Examiner* — Audrey K Bradley
*Assistant Examiner* — Kelsey Stanek

(57) ABSTRACT

An on-board diagnostics system for an exhaust system of an internal combustion engine is disclosed. The system comprises a catalyzed substrate having a catalyzed region and an uncatalyzed region, a first sensor, and a second sensor. The first sensor is located within the catalyzed region of the catalyzed substrate and the second sensor is located within the uncatalyzed region of the catalyzed substrate. A method for on-board diagnostics of the catalyzed substrate is also disclosed.

10 Claims, 2 Drawing Sheets

Example OBD

(56) References Cited

U.S. PATENT DOCUMENTS

| | | | |
|---|---|---|---|
| 6,739,176 B2 | 5/2004 | Neuhausen et al. | |
| 8,127,537 B2 | 3/2012 | Arnold et al. | |
| 8,205,437 B2 * | 6/2012 | Arnold | F01N 3/2828 60/277 |
| 8,327,632 B2 | 12/2012 | Phillips et al. | |
| 2007/0137187 A1 * | 6/2007 | Kumar | F01N 3/0222 60/299 |
| 2008/0092524 A1 * | 4/2008 | Yokoyama | F01N 11/002 60/277 |
| 2008/0314034 A1 * | 12/2008 | Arnold | F01N 3/2828 60/299 |

FOREIGN PATENT DOCUMENTS

| | | |
|---|---|---|
| DE | 4228052 A1 | 4/1993 |
| DE | 4228536 A1 | 3/1994 |
| EP | 0849587 A2 | 6/1998 |
| EP | 0849588 A2 | 6/1998 |

* cited by examiner

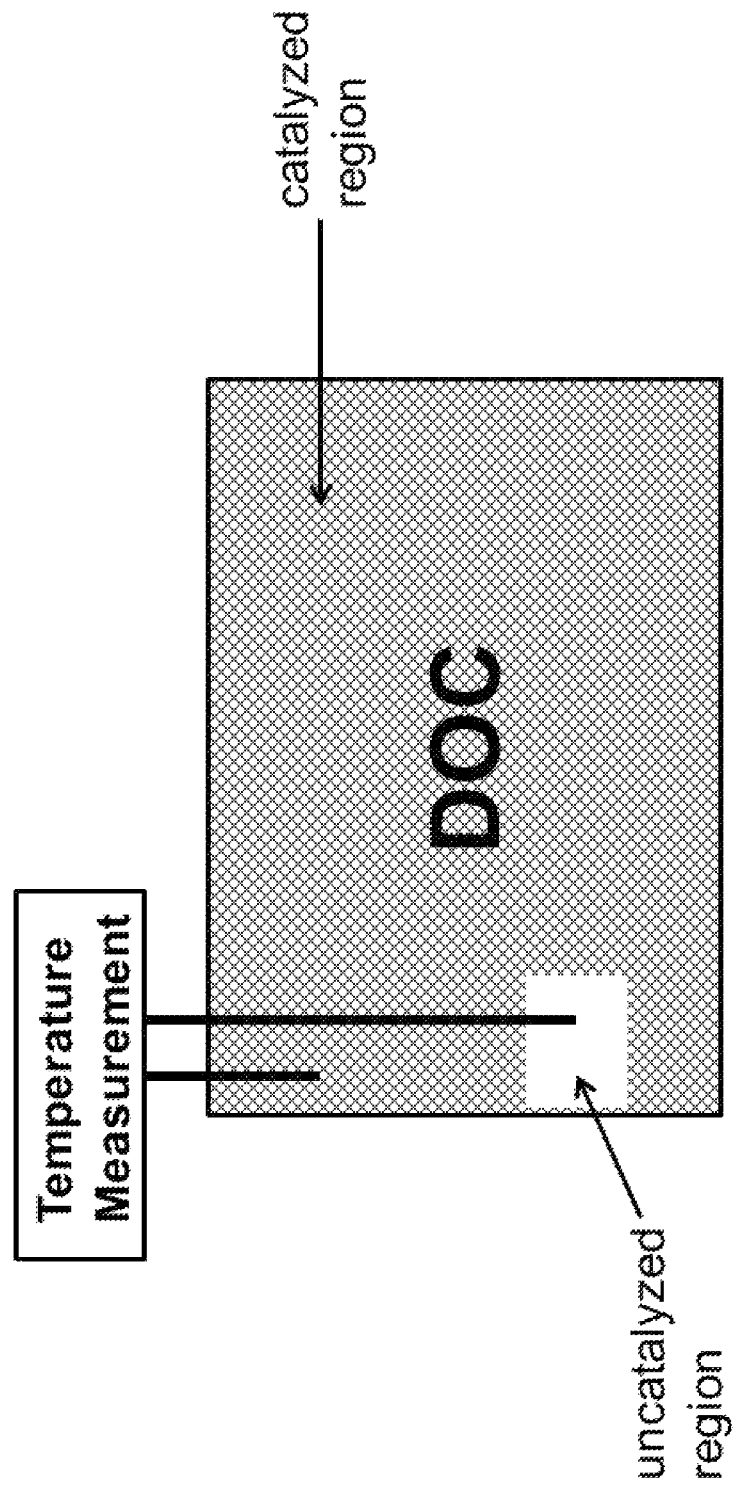
FIGURE 1A: Example OBD

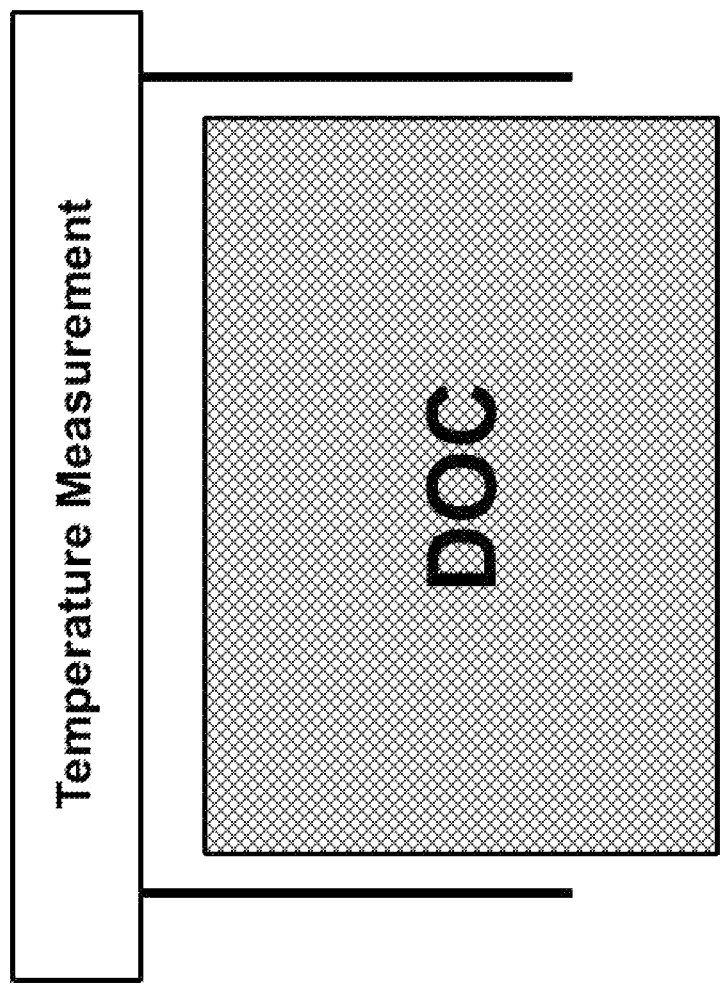
FIGURE 1B: Comparison OBD

ON-BOARD DIAGNOSTICS SYSTEM FOR CATALYZED SUBSTRATE

FIELD OF THE INVENTION

The invention relates to an on-board diagnostics system for a catalyzed substrate, particularly a diesel oxidation catalyst, and a method for on-board diagnostics of a catalyzed substrate in an exhaust system.

BACKGROUND OF THE INVENTION

Internal combustion engines produce exhaust gases containing a variety of pollutants, including hydrocarbons, carbon monoxide, nitrogen oxides ("$NO_x$"), sulfur oxides, and particulate matter. Increasingly stringent national and regional legislation has lowered the amount of pollutants that can be emitted from such diesel or gasoline engines. Exhaust systems containing various catalyst components have been developed to attain these low emission levels.

With the increasing complexity of these exhaust systems, on-board diagnostics have been developed to allow vehicle owners to understand the operating condition of the exhaust system. On-board diagnostics ("OBD") in the context of a motor vehicle is a generic term to describe the self-diagnostic and reporting capability of the vehicle's systems provided by a network of sensors linked to a suitable electronic management system. Early examples of OBD systems would simply illuminate a malfunction indicator light if a problem were detected, but it provided no information on the nature of the problem. More modern OBD systems use a standardized digital connection port and are capable of providing information on standardized diagnostic trouble codes and a selection of real-time data, which enable rapid problem identification and resolution of a vehicle's systems.

Besides lowering engine emissions from a vehicle, newer legislation also requires the increasing use of on-board diagnostics (OBD) to notify the driver in case of a malfunction or deterioration of the emission system that would cause emissions to exceed mandatory thresholds; e.g., a particulate matter, carbon monoxide, hydrocarbon and/or $NO_x$ level above a set limit (typically in g/km of a pollutant emissions). A typical method of on-board diagnostics includes placing a sensor before a catalytic component and another sensor after the catalytic component and measuring the sensor value difference to determine whether the component is functioning properly. For example, U.S. Pat. No. 6,739,176 teaches a process for checking the operability of an exhaust gas purification catalyst for diesel engines, which includes placing CO sensors upstream and downstream of a catalyst as well as a temperature probe downstream of the catalyst. U.S. Pat. No. 4,029,472 discloses a thermoelectric sensor for detecting the quantitative content of combustibles in an exhaust gas having two thermocouple junctions where an exhaust gas oxidation catalyst adjacent one of the junctions provides a junction temperature differential when the ceramic body is exposed to exhaust gas flow. The output difference between the two junctions is proportional to the concentration of residual combustibles in the exhaust gas. U.S. Pat. No. 8,127,537 discloses an exhaust system that comprises a three-way catalyst (TWC) and a single lambda sensor. The TWC has a catalyst composition in at least a part of the length of channels extending from the inlet end that has a reduced oxygen storage activity, or no oxygen storage activity, relative to the catalyst composition in the remainder of the TWC. The single lambda sensor is contacted substantially only with exhaust gas that has first contacted the TWC composition having a reduced oxygen storage activity or no oxygen storage activity. U.S. Pat. No. 8,205,437 teaches an exhaust system that comprises a monolith substrate coated with a catalyst, and a first sensor disposed in a hole defined in part by an external wall of the monolith substrate. The catalyst composition in at least a part of the length of channels extending from the upstream end has an increased activity for a reaction for which the catalyst composition is intended relative to catalyst composition in the remainder of the substrate. The sensor is arranged such that it is contacted substantially only with exhaust gas that has first contacted the catalyst composition having an increased activity. Also, U.S. Pat. No. 8,327,632 discloses an exhaust system which has a catalyzed soot filter (CSF), a control unit, and a catalyzed sensor. The system can increase hydrocarbon (HC) and/or carbon monoxide (CO) content in an exhaust gas flowing into the CSF resulting in combustion of the HC and/or CO in the CSF, a temperature increase of the CSF, and combustion of particulate matter collected on the CSF.

We have found that sensors placed upstream and downstream of a catalyst component are not accurate enough because of the transient nature of vehicle exhaust conditions, compounded by the relatively small exotherm typically found for diesel exhaust gas compared to the transient changes in exhaust gas temperatures.

As with any automotive system and process, it is desirable to attain still further improvements in on-board diagnostics systems. We have discovered a new on-board diagnostics system for a catalyzed substrate in an exhaust system.

SUMMARY OF THE INVENTION

The invention is an on-board diagnostics system for an exhaust system of an internal combustion engine. The on-board diagnostics system comprises a catalyzed substrate having a catalyzed region and an uncatalyzed region, a first sensor, and a second sensor. The first sensor is located within the catalyzed region of the catalyzed substrate and the second sensor is located within the uncatalyzed region of the catalyzed substrate. The invention also includes a method for on-board diagnostics of the catalyzed substrate. The method comprises measuring the temperature of the catalyzed region at a first sensor and the temperature of the uncatalyzed region at the second sensor; calculating the temperature difference; and determining whether the catalyzed substrate has passed or failed the diagnostic test by comparing the temperature difference to the expected difference for a passing and failing catalyst substrate.

BRIEF DESCRIPTION OF THE DRAWINGS

FIG. 1A illustrates one embodiment of the invention.
FIG. 1B illustrates a comparison arrangement showing pre- and post-catalyst thermocouples.

DETAILED DESCRIPTION OF THE INVENTION

The on-board diagnostics system of the invention comprises a catalyzed substrate having a catalyzed region and an uncatalyzed region.

The catalyzed substrate comprises a substrate that contains a catalyst component. The catalyst component is typically a washcoat comprising one or more inorganic oxides and one or more metals. The catalyzed substrates are used in processes for cleaning exhaust gases formed in internal combustion engines.

The substrate of the catalyzed substrate is preferably a monolith substrate. The monolith substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. The metallic substrate may be made of any suitable metal, and in particular heat-resistant metals and metal alloys such as titanium and stainless steel as well as ferritic alloys containing iron, nickel, chromium, and/or aluminum in addition to other trace metals (typically, rare earth metals).

The substrate is preferably a flow-through substrate, but may also be a filter substrate. The flow-through substrates preferably have a honeycomb structure with many small, parallel thin-walled channels running axially through the substrate and extending throughout the substrate. If the substrate is a filter substrate, it is preferably a wall-flow monolith filter. The channels of a wall-flow filter are alternately blocked, which allow an exhaust gas stream to enter a channel from the inlet, and then flow through the channel walls, and exit the filter from a different channel leading to the outlet. Particulates in the exhaust gas stream are thus trapped in the filter.

The catalyst on the catalyzed substrates is typically added to the substrate as a washcoat that typically comprises a number of components including one or more inorganic oxides and one or more metals. The inorganic oxide most commonly includes oxides of Groups 2, 3, 4, 5, 13 and 14 elements. Useful inorganic oxides preferably have surface areas in the range 10 to 700 $m^2/g$, pore volumes in the range 0.1 to 4 mL/g, and pore diameters from about 10 to 1000 Angstroms. The inorganic oxide is preferably alumina, silica, titania, zirconia, niobia, tantalum oxides, molybdenum oxides, tungsten oxides, rare earth oxides (in particular ceria or neodymium oxide), or mixed oxides or composite oxides of any two or more thereof, e.g. silica-alumina, ceria-zirconia or alumina-ceria-zirconia, and can also be a zeolite.

The one or more metals typically include one or more platinum group metals (PGMs), preferably platinum, palladium, and/or rhodium. The one or more metals may also include metal oxides such as oxides of alkaline earth metals (such as barium, calcium, strontium, and magnesium), alkali metals (such as potassium, sodium, lithium, and cesium), rare earth metals (such as lanthanum, yttrium, praseodymium and neodymium), or combinations thereof, as well as metal carbonates, metal sulfates, metal nitrates, metal acetates, and metal hydroxides.

Although any catalyzed substrate can be used in the invention, the catalyzed substrate is preferably a diesel oxidation catalyst (DOC).

DOC components are well-known in the art. DOCS are designed to oxidize CO to $CO_2$ and gas phase hydrocarbons (HC) and an organic fraction of diesel particulates (soluble organic fraction) to $CO_2$ and $H_2O$. Typical DOC components include platinum and optionally also palladium on a high surface area inorganic oxide support, such as alumina, silica-alumina and a zeolite.

The catalyzed substrate has a total volume. Typical total volumes for the catalyzed substrate are from about 1.0 to about 15 L. The uncatalyzed region of the catalyzed substrate preferably comprises less than 50% of the total volume off the catalyzed substrate, more preferably less than 25 percent of the total volume of the catalyzed substrate, and even more preferably less than 10 percent of the total volume of the catalyzed substrate.

The uncatalyzed region of the catalyzed substrate may be an uncoated region of the substrate, for example a region of just the bare substrate, but preferably the uncatalyzed region is a portion of the substrate that is coated with an inert washcoat. An inert washcoat will contain no catalytically active metals (e.g., PGM or other transition metals) to catalyze the oxidation of hydrocarbons or carbon monoxide. Preferably, the inert washcoat will consist of one or more inorganic oxides such as alumina, silica, titania, zirconia, niobia, rare earth oxides (in particular ceria or neodymium oxide), or mixed oxides or composite oxides of any two or more thereof, e.g. silica-alumina, ceria-zirconia or alumina-ceria-zirconia, and may also be a zeolite.

The use of an inert washcoat for the uncatalyzed region may be preferable since it may give more equal thermal mass of the uncatalyzed and catalyzed regions to improve transient differential temperature accuracy. The use of an inert washcoat for the uncatalyzed region may also result in a more equal back pressure of the two regions to give more even flow distribution.

Typically, the catalyzed substrate has an inlet end and an outlet end, with an axial length extending from the inlet end to the outlet end. The uncatalyzed region preferably extends from the inlet end of the catalyzed substrate along a portion of the axial length of the catalyzed substrate. More preferably, the uncatalyzed region extends from the inlet end of the catalyzed substrate for about 50% or less of the axial length of the catalyzed substrate.

In one embodiment, the uncatalyzed region extends along 100 percent of the radial length of the catalyzed substrate. Preferably, when the uncatalyzed region extends along the entire radial length of the catalyzed substrate, the exhaust system will further comprise an additional oxidation catalyst located downstream of the catalyzed substrate. This additional oxidation catalyst can be a diesel oxidation catalyst but is preferably a catalyzed soot filter (CSF). A catalyzed soot filter (CSF) is a filter substrate that is coated with a catalyst of similar composition and function to a DOC. It can also assist in the combustion of diesel particulate matter. Typical CSF catalyst components include platinum, palladium, and a high surface area inorganic oxide.

The additional oxidation catalyst downstream of the catalyzed substrate may be useful to clean up emissions (e.g., hydrocarbons and CO) that have passed through the uncatalyzed region without being oxidized.

In an alternative embodiment, a second catalyzed region that has a much higher light-off temperature may be used in place of the uncatalyzed region. This is accomplished, for instance, by using a second catalyzed region that has much lower PGM loading as compared to the catalyzed region of the catalyzed substrate. A potential advantage of this embodiment is that emissions passing through this second catalyzed region at higher temperatures will be converted, but would not produce significant exotherm during the conditions needed for OBD measurement, so as not to interfere with OBD.

The catalyzed substrate may be produced by any conventional means. For example, differential coating to create a catalyzed substrate that consists of a catalyzed region and an uncatalyzed region may be achieved by a containment means that may be shaped to blank off areas of the substrate, so that coating is not carried out in those areas but only areas that are not blocked by the containment means. Additionally, the containment means may be divided internally to separate different liquids for coating, or parts may be blanked off to prevent coating.

The on-board diagnostics system of the invention also comprises a first sensor and a second sensor. The first sensor is located within the catalyzed region of the catalyzed substrate. The second sensor is located within the uncatalyzed region of the catalyzed substrate. Sensors useful in the on-board diagnostics system of the invention include temperature sensors, hydrocarbon sensors, oxygen sensors, lambda sensors, nitrogen oxides ($NO_x$) sensors, and carbon monoxide sensors. Temperature sensors, such as a thermocouple, are particularly preferred.

Preferably the first sensor and the second sensor are located at a similar length along the axial length of the catalyzed substrate. More preferably, they are located within about 1 inch (2.54 cm) of each other along the axial length of the catalyzed substrate, and even more preferably are located at the same length along the axial length of the catalyzed substrate.

The on-board diagnostics system of the invention is preferably used to detect the potential deterioration of a catalyzed substrate located in the exhaust system. The ability of the catalyzed substrate to combust hydrocarbon and carbon monoxide in the exhaust gas is measured by the difference between the two recorded sensed values (e.g., temperature), giving a direct catalyst OBD measurement by comparing the difference to the expected difference for a passing and failed catalyzed substrate.

The sensed values (e.g., temperature, CO level) of the first sensor and the second sensor may be measured continuously, and if the difference between the first sensed value and the second sensed value falls below a pre-determined value this would trigger a malfunction indicator light (MIL) to indicate the performance of the catalyzed substrate has fallen below a set level. For example, as a catalyzed substrate deteriorates in performance, the measured temperature of the catalyzed region will begin to approach the measured temperature of the uncatalyzed region. As the difference in temperature falls below a set value (e.g., temperature difference of 10° C. or less), then the catalyzed substrate fails the diagnostic test.

The invention also encompasses a method for on-board diagnostics of the catalyzed substrate in an exhaust system for an internal combustion engine. The method comprises measuring the temperature (or any other sensed value such as $O_2$ amount or CO amount) in the uncatalyzed region at the second sensor and the temperature (or any other sensed value such as $O_2$ amount or CO amount) in the catalyzed region at the first sensor. The temperature difference is calculated by subtracting the temperature of the second sensor from the temperature of the first sensor. It is then determined whether the catalyzed substrate has passed or failed the diagnostic test by comparing the temperature difference to the expected difference for a passing and failing catalyst substrate. For example, a temperature difference of more than 10° C. may indicate a passing catalyst substrate while a temperature difference of 10° C. or less may indicate a failing catalyst substrate.

In the method of the invention, it is preferable that the first sensor and the second sensor are located at a similar length along the axial length of the catalyzed substrate. More preferably, the first thermal sensor will be located within 1 inch of the second thermal sensor along the axial length of the catalyzed substrate; and more preferably will be located at the same axial length. Although the first thermal sensor and second thermal sensor are preferably located at a similar length along the axial length of the catalyzed substrate, they may be preferably located at different points on the substrate itself, for example on the opposite side of the substrate from one another.

In addition, the method of the invention further comprises triggering a malfunction indicator light when the temperature difference (or the difference between any other sensed value, such as $O_2$ amount or CO amount) decreases below a pre-determined value. The pre-determined value is set by the temperature difference for a deactivated catalyst. Preferably, the differential temperature data can be input into an algorithm that will sum up or average the change in temperature over a period of time. In that way, the malfunction indictor light will not be triggered by one erroneous data point.

The following examples merely illustrate the invention. Those skilled in the art will recognize many variations that are within the spirit of the invention and scope of the claims.

EXAMPLES OF THE INVENTION

Example 1

Preparation of DOC with Catalyzed and Uncatalyzed Regions

A monolith substrate (118 mm diameter and 140 mm length) is coated with a state of the art DOC coating containing platinum and palladium (Pt:Pd=2:1), at a loading of 50 g/ft$^{-3}$. The rear of the substrate is dosed with 50% of the coating using conventional washcoating procedures. The front of the substrate is dosed with the other 50% of the coating with a blanked-off region (masked) using a conventional precision coating protocol as per the first dose to produce DOC1.

Example 2

Vehicle Testing Comparison

Vehicle testing is performed on a 1.5 L Euro5 vehicle equipped with a 1.5 L DOC (DOC1) and a CSF. DOC1 is evaluated over the New European Driving Cycle (NEDC) with exhaust temperatures and emissions measured. Emission measurements are performed on a CVS roller dynamometer equipped to measure pre- and post-catalyst modal emissions for all regulated emissions. Two thermocouples are added to the system to measure pre- and post-DOC temperatures according to conventional methods. In addition, the OBD of the invention is tested by adding two thermocouples carefully positioned in the monolith at the same distance (35 mm) from the front face and at the same radial location of 30 mm from sides. One thermocouple is located in the conventionally coated region of the monolith and the other is located in an uncoated region of the monolith. DOC1 with the OBD thermocouples is illustrated in FIG. 1A and the placement of the convention pre- and post-catalyst thermocouples is illustrated in FIG. 1B. During testing, the difference in temperature between a thermocouple mounted in an uncatalyzed region of the DOC and a thermocouple mounted in a catalyzed region at a similar axial and radial location is determined; the temperature difference between the pre- and post-catalyst temperatures is also measured. In addition to testing fresh DOC catalyst, the activity of the fresh DOC is adjusted using hydrothermal oven aging in order to compare the temperature profiles of a fresh, end of life aged, and OBD aged DOC catalyst.

The results show that the measured temperature differences during a "passive" NEDC cycle allow discrimination of fresh and aged DOCS using the OBD system of the invention, as compared to a system that places thermocouples upstream and downstream of the DOC. The OBD system of the invention shows improved resolution in both average temperature change (avg ΔT) and peak temperature change (max ΔT), as compared to monitoring the whole DOC volume with thermocouples upstream and downstream of the DOC.

TABLE 1

Comparison of System of Invention to Pre- and Post-Thermal Sensor System

| | System of Invention | | Comparison System | |
|---|---|---|---|---|
| | Avg ΔT | Max ΔT | Avg ΔT | Max ΔT |
| COP DOC | 19.9 | 60 | 55.0 | 119 |
| End of life aged DOC | 15.5 | 51 | 54.0 | 106 |
| OBD aged DOC | 9.6 | 29 | 50.3 | 106 |

We claim:

1. An on-board diagnostics system for an exhaust system of an internal combustion engine, the system comprising
    (1) a catalyzed substrate having a catalyzed region and an uncatalyzed region;
    (2) a first sensor; and
    (3) a second sensor,
    wherein the first sensor is located within the catalyzed region of the catalyzed substrate and the second sensor is located within the uncatalyzed region of the catalyzed substrate, and
    wherein the catalyzed substrate has a total volume, and the uncatalyzed region has a volume that is less than 25 percent of the total volume.

2. The on-board diagnostics system of claim 1 wherein the volume of the uncatalyzed region is less than 10 percent of the total volume of the catalyzed substrate.

3. The on-board diagnostics system of claim 1 wherein the catalyzed substrate has an inlet end and an outlet end, and an axial length extending from the inlet end to the outlet end, and the uncatalyzed region extends from the inlet end of the catalyzed substrate along a portion of the axial length of the catalyzed substrate.

4. The on-board diagnostics system of claim 3 wherein the uncatalyzed region extends from the inlet end of the catalyzed substrate for less than 60% of the axial length of the catalyzed substrate.

5. The on-board diagnostics system of claim 1 wherein the uncatalyzed region is coated with an inert washcoat.

6. The on-board diagnostics system of claim 1 wherein the first sensor and the second sensor are located at a similar length along the axial length of the catalyzed substrate.

7. The on-board diagnostics system of claim 1 wherein the first sensor and the second sensor are both thermal sensors.

8. The on-board diagnostics system of claim 7 wherein the first sensor and the second sensor are both thermocouples.

9. A method for on-board diagnostics of a catalyzed substrate in an exhaust system for an internal combustion engine, wherein the catalyzed substrate has a catalyzed region and an uncatalyzed region and a first sensor is located within the catalyzed region and a second sensor is located within the uncatalyzed region, wherein the catalyzed substrate has a total volume, and the uncatalyzed region has a volume that is less than 25 percent of the total volume, the method comprising:
    (a) measuring the temperature of the catalyzed region at the first sensor and the temperature of the uncatalyzed region at the second sensor;
    (b) calculating a difference in temperature between temperature of the catalyzed region and the temperature of the uncatalyzed region;
    (c) determining whether the catalyzed substrate has passed or failed the diagnostic test by comparing the temperature difference to an expected difference for a passing or failing catalyst substrate; and
    (d) triggering a malfunction indicator light when the catalyzed substrate has failed the diagnostic test after comparing the temperature difference.

10. The method of claim 9 wherein the catalyzed substrate has an inlet end and an outlet end, and an axial length extending from the inlet end to the outlet end, and the first thermal sensor and the second thermal sensor are located at a similar length along the axial length of the catalyzed substrate.

* * * * *